United States Patent [19]
Toyoda et al.

[11] 4,069,169
[45] Jan. 17, 1978

[54] PROCESS FOR PREPARATION OF CATALYST COMPONENT SUPPORTED ON HIGH PERFORMANCE CARRIER

[75] Inventors: Akinori Toyoda, Ohtake; Norio Kashiwa, Iwakuni, both of Japan

[73] Assignee: Mitsui Petrochemical Industries Ltd., Tokyo, Japan

[21] Appl. No.: 729,236

[22] Filed: Oct. 4, 1976

Related U.S. Application Data

[63] Continuation-in-part of Ser. No. 634,332, Nov. 24, 1975, abandoned.

[51] Int. Cl.$^2$ .................. B01J 31/02; B01J 31/12; B01J 27/06
[52] U.S. Cl. ................ 252/429 B; 252/429 C; 252/431 C; 252/441
[58] Field of Search ........... 252/429 B, 431 C, 429 C, 252/441

[56] References Cited

U.S. PATENT DOCUMENTS

| 3,803,105 | 4/1974 | Galli et al. | 252/429 C X |
|---|---|---|---|
| 3,859,231 | 1/1975 | Kochlar et al. | 252/429 B X |
| 3,888,835 | 6/1975 | Ito et al. | 252/429 C X |
| 3,953,414 | 4/1976 | Galli et al. | 252/429 C X |

FOREIGN PATENT DOCUMENTS

| 41,676 | 1972 | Japan. | |
|---|---|---|---|
| 1,235,062 | 6/1971 | United Kingdom | 252/429 B |

*Primary Examiner*—J. Poer
*Assistant Examiner*—William G. Wright
*Attorney, Agent, or Firm*—Sherman & Shalloway

[57] ABSTRACT

A process for preparing a catalyst component supported on a carrier which comprises contacting a titanium tetrahalide in the liquid or gaseous phase with a solid in the absence of mechanical pulverization, said solid being obtained by mechanically pulverizing specified combinations of components selected from the group consisting of a magnesium dihalide component selected from magnesium dihalides and adducts thereof with monocyclic aromatic monocarboxylic acid esters; a monocyclic aromatic monocarboxylic ester; and a titanium component selected from titanium compounds of the formula Ti(OR)$_n$X$_{4-n}$ wherein R is alkyl or optionally substituted phenyl, X is halogen, and n is an integer of 0 to 4 and complexes thereof with monocyclic aromatic monocarboxylic acid esters, the amounts of the magnesium dihalide (a), the monocyclic aromatic monocarboxylic acid ester (b), and the titanium compound (c) being selected such that the molar ratio of (a):(b):(c) is 1: (not less than 0.005):(100 to 0.001).

9 Claims, No Drawings

PROCESS FOR PREPARATION OF CATALYST COMPONENT SUPPORTED ON HIGH PERFORMANCE CARRIER

This application is a continuation-in-part of Ser. No. 634,332 filed Nov. 24, 1975, now abandoned.

The present invention concerns the preparation of a highly active carrier-supported catalyst component suitable for the manufacture of highly crystalline polymers of ethylene and other alpha-olefins, which catalyst component is obtained by chemically bonding and supporting a Ziegler-type catalyst component to and on particles of a magnesium dihalide.

The quantity of ash caused by Ti, Mg and Cl remaining in a polymer that is obtained by polymerization of an olefin can be significantly reduced by using the carrier-supported catalyst component covered by this invention in combination with an organometallic compound. Hence, the resulting polymer poses no problem in use even when it has not been subjected to a deashing treatment, and moreover, since the amounts of non-crystalline polymer and a low-crystalline polymer contained in the polymer are very small, such polymers, in certain applications, do not have to be removed before use. Furthermore, the melt index of the polymer can be controlled easily during polymerization.

In the past, in order to support the desired amount of a halide of a transition metal such as Ti on particles of an inorganic substance such as Mg dihalide, processes have been proposed (Japanese Patent Publication No. 41672/72), such as:

1. pulverizing the particles of an inorganic substance in the presence of a titanium tetrahalide, or
2. dissolving the particles in a organic solvent such as an alcohol, ether or amine, and then after rapid evaporation of the solvent, removing the solvent completely by heating the particles of a halide of Mg, etc., under reduced pressure.

We previously proposed a process by which to cause a halide of a transition metal to be supported on particles of halides of Mg, etc., by subjecting the particles to a preliminary treatment with an alcohol, ether, amine or another electron donor, and then bringing the particles into contact, in the liquid phase and under heat, with a halide of a transition metal. However, the above-mentioned processes do not meet more stringent requirements on catalyst activity and crystallinity of the polymers produced.

U.S. Pat. No. 3,876,076 teaches the preparation of an active titanium catalyst component by forming a reaction product between an organomagnesium compound of the formula R'-MgX or R'MgR" wherein R' and R" are hydrocarbon radicals such as alkyl and X is a halogen such as Cl or Br, a mono-halogenated hydrocarbon such as alkyl chloride, and a tetravalent titanium compound, and then subjecting the solid product obtained in which the titanium compound is in the form of a trivalent titanium compound to an oxidizing treatment so as to convert the trivalent titanium compound to a tetravalent compound. In this prior method, compounds of the above formula in which Mg is bonded to the carbon atoms of the hydrocarbon radical are used instead of the magnesium dihalides. The patent does not disclose the employment of a mechanical pulverization means for the preparation of the above reaction product. Furthermore, as will be shown hereinbelow by comparative examples, when the use of mechanical pulverization is omitted in the formation of the solid (B) in the present invention, or the contacting of the titanium tetrahalide (A) with the solid (B) is performed with mechanical pulverization, only inferior catalyst components can be obtained.

British Pat. No. 1,235,062 teaches a catalyst prepared by mixing (a) an Al-halogen compound, (b) a Ti compound and (c) an organomagnesium compound of the formula $MgR_nX_{2-n}$ in which R is alkyl, cycloalkyl, alkaryl, aryl or aralkyl, X is an activator residue or halogen, and $n$ is a number from 1 to 2, while adding an activator including a carboxylic acid ester at an optional time. In this method, too, organomagnesium compounds having a C-Mg bond are used instead of the magnesium dihalides, and no mechanical pulverization is performed. As mentioned hereinabove, the omission of mechanical pulverization in the present invention cannot give a satisfactory catalyst component. As will be shown hereinbelow by a comparative example, the improvement obtained by the catalyst component of this invention cannot be achieved by a catalyst composed of an Al-halogen compound, and a component obtained by mixing n-butyl magnesium chloride and ethyl acetate as an activator, as illustrated in the British Patent, and reacting the mixture with a titanium compound.

The objective of the present invention is to provide a process by which to prepare a Ti component of a polymerization catalyst that not only gives a higher activity than the catalyst prepared by the prior processses, but also enables the production of highly crystalline polymers.

According to the invention, there is provided a process for preparing a catalyst component supported on a carrier, which comprises contacting (A) a titanium tetrahalide in the liquid or gaseous phase with (B) a solid in the absence of mechanical pulverization, said solid (B) being obtained by either 1. mechanically pulverizing an adduct of a magnesium dihalide with a monocyclic aromatic monocarboxylic acid ester;
2. mechanically pulverizing a magnesium dihalide and an adduct of a magnesium dihalide with a monocyclic aromatic monocarboxylic acid ester;
3. mechanically pulverizing a monocyclic aromatic monocarboxylic acid ester and at least one magnesium dihalide component selected from the group consisting of magnesium dihalides and adducts thereof with monocyclic aromatic monocarboxylic acid esters;
4. mechanically pulverizing a magnesium dihalide and a complex of a titanium compound of the formula $$Ti(OR)_nX_{4-n}$$

wherein R is an alkyl radical, or a phenyl radical optionally substituted by a lower alkyl group, X is a halogen atom, and $n$ is an integer of 0 to 4, with a monocyclic aromatic monocarboxylic acid ester;

5. mechanically pulverizing an adduct of a magnesium dihalide with a monocyclic aromatic monocarboxylic acid ester and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid ester;

6. mechanically pulverizing a magnesium dihalide, an adduct of a magnesium dihalide with a monocyclic aromatic monocarboxylic acid ester, and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid ester; or 7. mechanically pulverizing a monocyclic aromatic monocarboxylic acid esters, at least one magnesium dihalide component selected from the group consisting of magnesium dihalides and adducts thereof with monocyclic aromatic monocarboxylic acid esters, and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters, wherein the amounts of the magnesium dihalide (a), the monocyclic aromatic monocarboxylic acid ester (b) and the titanium compound (c) of the above formula are selected such that the molar ratio of (a):(b):(c) is 1:(not less than 0.005):(100 to 0.001), and wherein when the adduct of magnesium dihalide or the complex of titanium compound is used, the amount of the mono-cyclic aromatic monocarboxylic acid ester therein is considered as the amount of (b).

According to the process of the invention, the titanium tetrahalide (A) is contacted in the liquid or gaseous phase with the solid (B) in the absence of mechanical pulverization. In the formation of the solid (B), however, the contacting of the magnesium dihalide with the monocyclic aromatic monocarboxylic acid ester must be carried out under mechanical pulverization.

Rotary ball mills, vibrational ball mills, and impact mills are examples of suitable means of bringing into mutual contact the magnesium component, the aromatic acid ester and the titanium component as raw materials for solid (B) under mechanical pulverization. Thus, in the present invention, the term "mechanical pulverization" denotes the vigorous pulverization of the magnesium component by the above-exemplified means.

The monocyclic aromatic monocarboxylic acid ester may be in the form of an adduct with a magnesium dihalide, or a complex with a titanium compound of the above formula as well as in the free form. When the amount of the aromatic acid ester in the form of an adduct with a magnesium dihalide in the form of a complex with the titanium compound of the above formula is above about 0.005 mole per mole of the magnesium dihalide, it is not necessary to add any monocyclic aromatic monocarboxylic acid ester (to be sometimes abbreviated as an aromatic acid ester), but the addition of free aromatic acid ester under these conditions is optional. Furthermore, even when the molar ratio of the aromatic acid ester present as an adduct or complex is greater than 10 moles per mole of the magnesium dihalide, the addition of free aromatic acid ester is permissible although not preferred. When the above adduct and/or complex of the aromatic acid ester is used conjointly with the free aromatic acid ester, the ester in the adduct and/or complex may be the same, or different, in kind or as from the free ester to be used together.

In the present invention, the solid (B) is formed under mechanical pulverization. There are seven procedures available for it as shown below.

1. An adduct of a magnesium dihalide (a) with a monocyclic aromatic monocarboxylic acid ester (b) is mechanically pulverized.

2. A magnesium dihalide (a) and an adduct of a magnesium dihalide (a) with a monocyclic aromatic monocarboxylic acid ester (b) are mechanically pulverized.

3. A monocyclic aromatic monocarboxylic acid ester (b) and at least one magnesium dihalide component selected from the group consisting of magnesium dihalides (a) and adducts thereof with monocyclic aromatic monocarboxylic acid esters are mechanically pulverized.

4. A magnesium dihalide (a) and a complex of a titanium compound (c) of the formula $$Ti(OR)_nX_{4-n}$$

wherein R is an alkyl radical, or a phenyl radical optionally substituted by a lower alkyl group, particularly an alkyl group with 1 to 4 carbon atoms, X is a halogen atom, and $n$ is an integer of 0 to 4, with a monocyclic aromatic monocarboxylic acid ester (b) are mechanically pulverized.

5. An adduct off a magnesium dihalide (a) with a monocyclic aromatic carboxylic acid ester (b) and at least one titanium component selected from the group consisting of titanium compounds of the formula $$Ti(OR)_nX_{4-n}$$

wherein R is an alkyl radical, or a phenyl radical optionally substituted by a lower alkyl group, particularly an alkyl group with 1 to 4 carbon atoms, X is a halogen atom, and $n$ is an integer of 0 to 4, and a complex thereof with a monocyclic aromatic monocarboxylic acid ester (b) are mechanically pulverized.

6. A magnesium dihalide (a), an adduct of a magnesium dihalide (a) with a monocyclic aromatic monocarboxylic acid ester (b) and at least one titanium component selected from the group consisting of titanium compounds (c) of the formula $$Ti(OR)_nX_{4-n}$$

wherein R is an alkyl radical, or a phenyl radical optionally substituted by a lower alkyl group, particularly an alkyl group with 1 to 4 carbon atoms, X is a halogen atom, and $n$ is an integer of 0 to 4, and complexes thereof with monocyclic aromatic monocarboxylic acid esters are mechanically pulverized.

7. A monocyclic aromatic monocarboxylic acid ester (b), at least one magnesium dihalide component selected from the group consisting of magnesium dihalides (a) and adducts thereof with monocyclic aromatic monocarboxylic acid esters (b), and at least one titanium component selected from the group consisting of titanium compounds (c) of the formula

$Ti(OR)_nX_{4-n}$ wherein R is an alkyl radical, or a phenyl radical optionally substituted by a lower alkyl group, particularly an alkyl group with 1 to 4 carbon atoms, X is a halogen atom, and n is an integer of 0 to 4, and complexes thereof with monocylic aromatic monocarboxylic acid esters (b) are mechanically pulverized.

The order of pulverizing the components (a), adduct of (a), (b), (c), and complex of (c) and their combinations may be selected freely. Furthermore, each of these components may be composed of two or more species.

In the formation of the solid (B), the amounts of the magnesium dihalide (a), the monocyclic aromatic monocarboxylic acid ester (b) and the titanium compound (c) of the above formula are selected such that the molar ratio of (a):(b):(c) is 1:(not less than 0.005): (100 to 0.001). When the adduct of magnesium dihalide or the complex of titanium compound of the above formula is used, the amount of the monocyclic aromatic monocarboxylic acid ester in the adduct or complex is considered as the amount of (b). The preferred molar ratio of (a):(b):(c) is 1:(10 to 0.005): (100 to 0.001). Where the titanium compound (c) or its complex is not used, the ratio of (a): (b) is 1: (not less than 0.005), preferably 1:(10 to 0.005).

For example, when a rotary ball mill is used, the following treatment using various mills is suitably carried out in the following manner in order to bring two or more raw materials for the catalyst into mutual contact by pulverization. An 800-ml stainless steel (SUS-32) ball mill with an inside diameter of 100 ml, accomodating therein 100 stainless steel (SUS32) balls each with a diameter of 15mm, is charged with 20 to 40g of the raw materials that are contacted by pulverization for 48 hours or longer, or more preferably 72 hours or longer, at a rotating speed of 125 rpm. The pulverization temperature can be normally set approximately at room temperature and no heating or cooling is required. If the generation of heat during pulverization is excessive, however, cooling may be done to a suitable extent.

The pulverization can be carried out also in the presence of an inert hydrocarbon similar to those used as a polymerization solvent, or its halogen derivative. In the course of preparing a carrier-supported catalyst component of the present invention, the co-pulverized solid [B] may be treated as a suspension in a treatment liquid comprising a Ti tetrahalide or its solution in an inert solvent, normally by simple stirring for one hour or longer at 40° C to the boiling point of the treatment liquid.

Various raw materials for the preparation of the carrier-supported catalyst component of this invention will be described below.

The Mg dihalide is preferably as anhydrous as possible. However, the inclusion of moisture is tolerable to such an extent that it does not affect the properties of the catalyst. If a commercially available dihalide is to be employed, it should be dehydrated before use at 100° to 400° C under reduced pressure. Moreover, from the standpoint of convenience in use, it is advantageous to employ the dihalide in the form of powder comprising particles of about 50 microns in average diameter. However, since the dihalide is pulverized in the course of mechanical pulverisation during the catalyst component preparation, larger particle diameters are also acceptable. Suitable Mg dihalides are, for example, $MgCl_2$, $MgBr_2$ and $MgI_2$, of which $MgCl_2$ is particularly preferred.

The ester of a monocyclic aromatic monocarboxylic acid is preferably selected from the following: 1. Esters of monocyclic aromatic monocarboxylic acids that do not possess a substituent in the aromatic ring:

a. Alkyl benzoates (wherein the alkyl radical is a saturated or an unsaturated hydrocarbon radical, usually $C_1-C_8$, and more preferably $C_1-C_4$). For example: Methyl benzoate, ethyl benzoate, n- and 1-propyl benzoate, n-, i-, sec- and tert-butyl benzoate, n- and i-amyl benzoate, n-hexyl benzoate, n-octyl and 2-ethylhexyl benzoate, vinyl benzoate, allyl benzoate, and more preferably methyl benzoate and ethyl benzoate, b. Cycloalkyl benzoates (wherein the cycloalkyl radical is a monoaromatic hydrocarbon normally $C_3-C_8$, and more preferably $C_5-C_6$). For example: Cyclopentyl benzoate and cyclohexyl benzoate, c. Aryl benzoates (wherein the aryl radical is an hydrocarbon radical, normally $C_6-C_{10}$, or more preferably $C_6-C_8$, and which can have a halogen atom and/or an alkyl radical normally having 1 to 4 carbon atoms bonded to its ring). For example: Phenyl benzoate, 4-tolyl benzoate, benzyl benzoate, styryl benzoate, 2-chlorophenyl benzoate, and 4-chlorobenzyl benzoate, 2. Esters of monocyclic aromatic monocarboxylic acids, in which in electron donating substitutent such a hydroxyl, alkoxyl or alkyl radical is bonded to the aromatic ring:

a. Esters of hydroxybenzoic acids (wherein the alkyl, cycloalkyl and aryl radical of the ester correspond to those defined under "1-a", "1-b" and "1-c" respectively). For example: Methyl salicylate, ethyl salicylate, i-butyl salicylate, i-amyl salicylate, allyl salicylate, methyl p-hydroxybenzoate, ethyl p-hydroxybenzoate, n-propyl p-hydroxybenzoate, sec-butyl p-hydroxybenzate, 2-ethylhexyl p-hydroxybenzoate, cyclohexyl p-hydroxybenzoate, phenyl salicylate, 2-tolyl salicylate, benzyl salicylate, phenyl p-hydroxybenzoate, 3-tolyl p-hydroxybenzoate, benzyl p-hydroxybenzoate, and ethyl alpharesorcylate, b. Esters of alkoxybenzoic acids (wherein the alkyl radical in the alkoxyl radical is an alkyl radical, normally $C_1-C_4$, or more preferably a methyl or ethyl radical, and the alkyl radical and aryl radical of the ester correspond to those defined under "1-a" and "1-c" respectively). For example: Methyl anisate, ethyl anisate, i-propyl anisate, i-butyl anisate, phenyl anisate, benzyl anisate, ethyl o-methoxybenzoate, methyl p-ethoxybenzoate, ethyl p-ethoxybenzoate, n-butyl p-ethoxybenzoate, ethyl p-allyloxybenzoate, phenyl p-ethoxybenzoate, methyl o-ethoxybenzoate, ethyl veratorate, and ethyl asymguaiacolcarboxylate, c. Esters of alkylbenzoic acids (wherein the alkyl radical bonded to the aromatic ring of the benzoic acid is a saturated or an unsaturated hydrocarbon radical, normally $C_1-C_4$, and the alkyl radical and the aryl radical of the ester correspond to those defined under "1-a" and "1-c" respectively). For example: Methyl p-toluate, ethyl p-toluate, i-propyl p-toluate, n-and i-amyl toluate, allyl p-toluate, phenyl p-toluate, 2-tolyl p-toluate, ethyl o-toluate, ethyl m-toluate, methyl p-ethylbenzoate, ethyl p-ethylbenzoate, sec-butyl p-ethylbenzoate, i-propyl o-ethylbenzoate, n-butyl m-ethylbenozate, ethyl 3,5-xylenecarboxylate, and ethyl p-styrenecarboxylate.

Examples of preferred esters are $C_1$-$C_8$ saturated or unsaturated alkyl esters of benzoic acid; $C_3$-$C_8$ cycloalkyl esters of benzoic acid; aryl esters of benzoic acid with aryl group optionally containing a substituent selected from the group consisting of halogen atoms and alkyl groups containing 1 to 4 carbon atoms; $C_1$-$C_8$ saturated or unsaturated alkyl esters of hydroxybenzoic acid; $C_3$-$C_8$ cycloalkyl esters of hydroxybenzoic acid; aryl esters of hydroxybenzoic acid with the aryl group optionally containing a substituent selected from the group consisting of halogen atoms and alkyl groups containing 1 to 4 carbon atoms; $C_1$-$C_8$ saturated or unsaturated alkyl esters of alkoxybenzoic acids with the alkoxy group containing 1 to 4 carbon atoms; aryl esters of alkoxybenzoic acids with the alkoxy group containing 1 to 4 carbon atoms in which the aryl group optionally contains a substituent selected from the group consisting of halogen atoms and alkyl groups containing 1 to 4 carbon atoms; $C_1$-$C_8$ saturated or unsaturated alkyl esters of alkylbenzoic acids in which the saturated or unsaturated alkyl group contains 1 to 4 carbon atoms; and aryl esters of alkylbenzoic acids in which the saturated or unsaturated alkyl group contains 1 to 4 carbon atoms and the aryl group optionally contains a substituent selected from the group consisting of halogen atoms and alkyl groups containing 1 to 4 carbon atoms.

Of these various esters of monocyclic aromatic monocarboxylic acid, saturated alkyl esters of benzoic acid, and particularly methyl benzoate and ethyl benzoate, are preferred.

The Ti component used for the preparation of the solid [B] in this invetion is a Ti compound represented by the general formula $$Ti(OR)_nX_{4-n}$$

wherein R, X and $n$ are the same as defined hereinabove.

Examples of R in the above general formula are straight-chain or branched-chain alkyl radicals, normally $C_1$-$C_4$, such as methyl, ethyl or n-propyl radical, and a phenyl radical. A Ti tetrahalide selected from $TiCl_4$, $TiBr_4$ and $TiI_4$, particularly $TiCl_4$, is preferred. Moreover, the Ti compound represented by the general formula $$Ti(OR)_nX_{4-n}$$

can be used in the form of a complex with the aromatic acid ester. In such a case, the aromatic acid ester used for the formation of such a complex may be identical to either one or both of:

1. the aromatic acid ester used to form an adduct with an Mg dihalide, and
2. the aromatic acid ester that can be used in the free form.

Saturated alkyl esters of benzoic acid, particularly methyl benoate and ethyl benzoate, are preferred as the aromatic acid ester that is suited for the formation of a complex with the said Ti compound such as Ti tetrahalide.

A complex of the Ti compound such as Ti tetrahalide with an organic acid ester can be prepared not only by commonly known processes, but also in the following manner. The aromatic acid ester is added to the Ti tetrahalide, for example, in a molar amount (ester radical-equivalent) equal to or larger than that of the Ti tetrahalide. The precipitate formed or a result of their reaction is callected by filtration. The reaction proceeds rapidly even at room temperature, and can also be carried out in the presence of an inert solvent. Washing (removal of the unreacted Ti tetrahalide and ester) can also be accomplished using the inert solvent.

The Ti tetrahalide [A] that comes into contact in the liquid or gaseous phase with the solid substance [B] may be the same as the Ti tetrahalide used to prepare the solid substance [B]. It is essential that the contacting of the titanium tetrahalide [A] with the solid [B] be carried out without mechanical pulverization.

By the "inert solvent" that may be used in the preparation of the carrier-supported catalyst component in the present invention is meant a solvent that is generally recognized as not acting adversely on the polymerization reaction of olefins using a Ziegler catalyst, and such a solvent is selected usually from saturated aliphatic hydrocarbons such as pentane, hexane, heptane, isooctane, and kerosene.

Moreover, commonly known polymerization solvents such as benzene, toluene, xylene, ethylbenzene, cyclopentane, cyclohexane, cyclooctane, methyl iodide, ethyl bromide, n-propyl chloride, methylene iodide, carbon tetrachloride, chloroform and chlorobenzene can also be used as the inert solvent.

In the preparation of the carrier-supported catalyst component of the present invention, it is necessary that each treatment step be carried out in an inert atmosphere containing as little oxygen and moisture as possible, for example, in an atmosphere of nitrogen, helium, argon under non-oxidizing conditions.

The catalyst component supported on a carrier can be used for the polymerization or copolymerization of olefins in combination with an organometallic compound catalyst component of a metal of Groups I to III of the periodic table.

The organo-metallic compound catalyst component may, for example, be compounds of formula RM wherein R is an alkyl or aryl group, and M is lithium, sodium or potassium; compounds of formula $R_2M'$ wherein R is the same as defined above and M' is zinc or cadmium; compounds of formula $R_{2-l}MgX_l$ wherein R is the same as defined above, X is a halogen atom and $l$ is zero or 1; compounds of formula $MAlR_4$ wherein R and M are the same as defined above; compounds of formula $R'_{3-m}AlX_m$ wherein R' is a hydrogen atom, or an alkyl or aryl group, X is the same as defined above, and $m$ is zero or a positive number of not greater than 3; compounds of formula $R'_{3-n}Al(OR)_n$ wherein R' is the same as defined above, and $n$ is a positive number greater than 0 but not greater than 3; and compounds of formula RAl(OR)X wherein R and X are the same as defined above.

If there are two or more R,R' and X in each of the above formula, they may be the same or different. Preferred alkyl groups represented by R or R' contain 1 to 12 carbon atoms, and preferred aryl groups represented by R or R' are phenyl and benzyl groups. X is preferably chlorine or bromine. Of the organometallic compounds exemplified above, the compounds of the formula $R'_{3-m}AlX_m$, $R'_{3-n}Al(OR)_n$, $R_{2-l}MgX_l$ and dialkyl zincs. Examples are trialkyl aluminums, alkyl aluminum halides, alkyl aluminum hydrides, dialkyl zincs, dialkyl magnesiums, and alkyl magnesium halides. Specific examples include triethyl aluminum, diethyl aluminum hydride, tripropyl aluminum, tributyl aluminum; diethyl aluminum chloride, diethyl aluminum bromide, diethyl aluminum ethoxide, diethyl aluminum phenoxide, ethyl aluminum ethoxychloride, and ethyl aluminum sesquichloride. Of these, the trialkyl aluminum such as triethyl aluminum, or tributyl aluminum, the dialkyl aluminum hydrides such as diisobutyl aluminum hydride, and the dialkyl aluminum halides such as diethyl aluminumchloride are preferred.

The polymerization reaction using the catalyst component in this invention may be carried out either in the presence of an inert liquid solvent, or in the absence of such a solvent, that is, in the presence of liquid olefin monomer.

The polymerization temperature, which may be selected from temperatures applicable to the customary polymerization of alpha-olefins using Ziegler catalysts is usually 200° C or lower. The polymerization pressure can be usually selected from those ranging from normal atmospheric pressure to about 50 Kg/cm$^2$.

The concentration of the catalyst to be fed to the reaction system for polymerization reaction may be selected in such a way that the ratio of the "Ti catalyst component of this invention (as Ti atoms)" to the "liquid phase of the reaction system" is usually 0.0001 to 1.0 mmol/1, and the ratio of the "number of Al atoms" to "the number of Ti atoms" is normally 1/1 to 100/1, or more preferably 1/1 to 30/1.

Addition of hydrogen to the reaction system is an effective method of reducing the molecular weight, or increasing the melt index, of the resulting polymer.

EXAMPLE 1

Catalyst Preparation [Formation of solid (B) by procedure (3)]

An 800-ml stainless steel (SUS-32) ball mill with an inside diameter of 100 mm, accomodating therein 100 stainless steel (SUS-32) balls each with a diameter of 15 mm, was charged with 20g of commercially available anhydrous MgCl$_2$ and 6.0 ml of ethyl benzoate in an atmosphere of nitrogen, and they were brought into mutual contact by pulverization for 72 hours at a rotating speed of 125 rpm. The resulting solid product was suspended in TiCl$_4$, and the suspension was stirred for further contact at 80° C for 2 hours. Then the solid component was collected by filtration, and washed with purified hexane until free TiCl$_4$ was no longer detected. A Ti-containing solid catalyst component was then obtained by drying the said solid component. The resulting catalyst component contained 4.2 wt% of Ti and 58.0 wt% of Cl as atoms. Then 0.0228g of the solid catalyst component was used for a test polymerization under the following conditions.

Polymerization

A 2-liter autoclave was charged with 750 ml of kerosene sufficiently free of oxygen and moisture, 0.016 ml (0.12 mmol) of triethylaluminum, and 0.0228g (0.02 mmol calculated as Ti atom) of the solid catalyst component. The polymerization system was heated, and when the temperature reached 70° C, propylene was introduced. Polymerization of the propylene was started at a total pressure of 7.0 kg/cm$^2$. After continuing polymerization at 70° C for 5 hours, introduction of propylene was stopped. The contents of the autoclave were cooled to room temperature, and its solid component was collected by filtration, and dried to afford 265.7g of polypropylene as a white powder. The boiling n-heptane extraction residue and the apparent density of the white polypropylene powder were 92% and 0.31 g/ml, respectively. On the other hand, the liquid phase was concentrated to yield 18.5g of a solvent-soluble polymer. the average specific polymerization activity per Ti atom of the catalyst used was 406 g-polypropylene/mmol-Ti.hr.atm.

EXAMPLE 2

Catalyst Preparation [Formation of solid (B) by Procedure (1)]

After suspending 20g of anhydrous MgCl$_2$ in 200 ml of kerosene containing 7.5 ml of ethylbenzoate, they were reacted together with agitation at 150° C for 2 hours. The solid component resulting from the reaction was collected by filtration, washed sufficiently with hexane, and dried to afford 26.7 g of a white, powdery solid. The powdery solid is considered to be a complex having an average composition of the formula MgCl$_2$.0.22PhCOOEt, wherein Ph represents a phenyl radical and Et an ethyl radical. Then 26.0g of the white powdery solid was fed in an atmosphere of nitrogen to an 800-ml stainless steel (SUS-32) ball mill with an inside diameter of 100 mm, accomodating therein 100 stainless steel (SUS-32) balls each with a diameter of 15mm. The powdery solid was treated for 100 hours at a rotating speed of 125 rpm. The resulting powder was suspended in 150 ml of TiCl$_4$ and the suspension was stirred for further contact at 80° C for 2 hours. The solid component was collected by filtration and washed with purified hexane until free TiCl$_4$ was no longer detected. The Ti-containing solid catalyst component, obtained by drying the said solid component, contained 4.0 wt% of Ti and 59.5% of Cl as atoms.

Polymerization

Using 0.024 g of the said solid catalyst component, propylene was polymerized under the same polymerization conditions as set forth in Example 1 except that 0.031 ml (0.12 mmol) of tri-i-butylaluminum was used instead of 0.016 ml of triethylaluminum. There were obtained 313.4g of polypropylene as white powder and 19.8g of a solventsoluble polymer. The boiling n-heptane extraction residue and the apparent density of the white polypropylene powder were 92.5% and 0.30g/ml. respectively. The average specific polymerization activity per Ti atom of the catalyst used was 476 g-polypropylene/mmol-Ti.hr.atm.

EXAMPLE 3

Catalyst Preparation

Catalyst raw materials were brought into mutual contact by pulverization under the same set of conditions as in Example 1, except that 8.5 ml of i-propyl benzoate was used instead of 6.0 ml of ethyl benzoate. The resulting Ti-containing solid catalyst component contained 4.5 wt% of Ti and 57.0 wt% of Cl as atoms.

Polymerization

The Ti-containing solid catalyst component prepared above, in an amount of 0.0213g, was used for polymerization under the same polymerization conditions as set forth in Example 1. The polymerization resulted in 274.7g of white polypropylene powder and 12.3 g of sollent-soluble polymer.

The boiling n-heptane extraction residue and the apparent density of the white polypropylene powder were 93% and 0.30 g/ml respectively. The average specific polymerization activity per Ti atom of the catalyst used was 410g-polypropylene/mmol-Ti.hr.atm.

EXAMPLES 4 and 5

Catalyst raw materials were brought into mutual contact by pulverization under the same conditions as set forth in Example 1, except that 6.90 ml of ethyl anisate and 6.72 ml of ethyl p-toluate were used in place of ethyl benzoate, in Examples 4 and 5 respectively.

The resulting solid catalyst component was used in an amount of 0.0223g in Example 4 and 0.0234g in Examples 5 respectively for the polymerization of propylene. The results of the polymerization in Examples 4 and 5 are shown in Table 1.

EXAMPLES 6 to 10

Carrier-supported catalyst compenents were prepared under different conditions, that is, by using catalyst raw materials in different combinations, and by changing the pulverization conditions and the conditions under which the solid component and TiCl$_4$ in the liquid phase were brought into contact. The results of propylene polymerization using the catalyst compenents so obtained in combination with various trialkylaluminums under a total pressure of 7 kg/cm$^2$ and at a temperature of 70° C, are shown in Table 2.

EXAMPLE 11 to 16 [Formation of solid (B) by procedure (3)]

An 800-ml stainless steel (SUS-32) ball mill with an inside diameter of 100 mm, accomodating therein 100 stainless steel (SUS-32) balls each with a diameter of 15 mm, was charged with 20g of anhydrous MgCl$_2$ and 6.0 ml of ethyl benzoate together with an inert hydocarbon, as listed in Table 3 below, in an atomosphere of nitrogen, and they were brought into mutual contact by pulverization for 120 hous at a rotating speed of 125 rpm. The resulting solid product was suspended in 150 ml of TiCl$_4$ and the suspension was stirred for further contact at 80° C for 2 hours. Then the solid component was collected by filtration and washed with hexane until free TiCl$_4$ was no longer detected. A Ti-containing solid catalyst component was then obtained by drying the solid component. The above procedure was carried out for each of the inert hydrocarbon given in Table 3. Thereafter, propylene was polymeized under the same condition as in Example 1 using each of the solid catalyst components. The results of polymerization are shown in Table 3.

Table 1

| | Catalyst component | | | Result of polymerization | | | | |
| | | Ti and Cl contents | | Polymer yield | | Extraction residue | Apparent | Average |
| Examples | Organic acid ester (ml) | Ti (wt%) | Cl (wt%) | Powdery polymer (g) | Soluble Polymer (g) | of powdery polymer (%) | density (g/ml) | specific activity* |
|---|---|---|---|---|---|---|---|---|
| 4 | Ethyl anisate (6.90) | 4.3 | 57.5 | 137.4 | 6.1 | 94 | 0.32 | 205 |
| 5 | Ethyl p-toluate | 4.1 | 58.5 | 203.1 | 13.9 | 94 | 0.31 | 310 |

Note: *g-polypropylene/mmol-Ti.hr.atm

Table 2-1

| | Preparation of catalyst component | | | | | | |
| | Carrier | Organic acid ester (& TiCl$_4$) | | Pulverizing | TiCl$_4$ | Quantity supported | |
| Example | MgCl$_2$ (g) | Name | Quantity (ml) | condition (rpm/hr) | treatment (° C/hr) | Ti (mg/g) | Cl (mg/g) |
|---|---|---|---|---|---|---|---|
| 6[1) | 20 | Ethyl benzoate | 6.0 | 125/72 | 80/2 | 42 | 580 |
| 7[2) | | MgCl$_2$ . 0.23 ethyl benzoate | | 125/100 | 80/2 | 40 | 595 |
| 8[3) | 20 | i-propyl benzoate, TiCl$_4$ | 8.5 | 125/72 | 80/2 | 45 | 570 |
| 9[4) | 20 | Ethyl anisate | 6.9 | 125/72 | 80/2 | 43 | 575 |
| 10[5) | 20 | Ethyl p-toluate | 6.72 | 125/72 | 40/8 | 41 | 585 |

[1), 4), 5) Formation of solid (B) by procedure (3)
[2) Formation of solid (B) by procedure (1)
[3) Formation of solid (B) by procedure (7)

Table 2-2

| | Polymerization condition | | | Result of polymerization | | | | | |
| | Ti | R$_3$Al | | Total polymer yield | Soluble polymer | Powder I.I. | Total I.I. | Apparent density | Average specific |
| Example | (mmol) | R | (mmol) | (g) | (g) | (%) | (%) | (g/ml) | activity* |
|---|---|---|---|---|---|---|---|---|---|
| 6 | 0.02 | Ethyl | 0.12 | 265.7 | 18.5 | 92 | 86 | 0.31 | 406 |
| 7 | 0.02 | i-butyl | 0.12 | 313.4 | 19.8 | 92.5 | 87 | 0.30 | 476 |
| 8 | 0.02 | i-butyl | 0.12 | 274.7 | 12.3 | 93 | 89 | 0.30 | 470 |
| 9 | 0.02 | i-butyl | 0.12 | 137.4 | 6.1 | 94 | 90 | 0.32 | 205 |
| 10 | 0.02 | i-butyl | 0.12 | 203.1 | 13.9 | 94 | 88 | 0.31 | 310 |

Note: *g-polypropylene/mmol-Ti.hr.atm

Table 3

| Examples | Solid catalyst component | | | | Result of polymerization | | | | |
|---|---|---|---|---|---|---|---|---|---|
| | Inert organic solvent | | Ti and Cl contents | | Polymer yield | | Extraction residue of powdery polymer (%) | Apparent density (g/ml) | Average specific activity* |
| | Name | Quantity (ml) | Ti (wt %) | Cl (wt %) | Powdery polymer (g) | Soluble polymer (g) | | | |
| 11 | Hexane | 2 | 2.4 | 63.2 | 410 | 15.6 | 96 | 0.32 | 608 |
| 12 | Pentane | 3 | 2.3 | 59.8 | 352 | 15.3 | 96 | 0.37 | 525 |
| 13 | Heptane | 3 | 2.8 | 62.2 | 401 | 13.2 | 95 | 0.30 | 592 |
| 14 | Octane | 3 | 2.2 | 63.4 | 330 | 10.6 | 93 | 0.28 | 487 |
| 15 | Toluene | 3 | 2.1 | 65.2 | 387 | 16.4 | 94 | 0.29 | 576 |
| 16 | i-propyl chloride | 3 | 2.2 | 60.8 | 380 | 11.5 | 91 | 0.30 | 559 |

Note: *g-polypropylene/mmol-Ti.hr.atm

EXAMPLES 17 TO 31

A catalyst component supported on a carrier was prepared by contacting a titanium tetrahalich [A] with a solid [B] in the absence of mechanical pulverization. The solids [B] were prepared by the means shown in Table 4.

A 2-liter autoclave was changed with 0.05 ml. (0.375 -1 m-mol) of triethyl aluminum, 0.0375 m-mol (calculated as titanium atom) of the titanium-containing solid component obtained above and 750 ml. of purified kerosene sufficiently free from oxygen and moisture. The polymerization system was heated, and when the temperature reached 60° C., propylene was introduced. Polymerization of the propylene was started at a total pressure of 8.0 kg/cm². After continuing the polymerization at 60° C. for 3 hours, the introduction of propylene was stopped. The inside of the autoclave was cooled to room temperature, and the catalyst was decomposed by addition of methanol. The solid component was collected by filtration, washed with methanol, and dried.

The results are shown in Table 4.

Table 4-(1)

| | Catalyst component supported on a carrier | | | | | | |
|---|---|---|---|---|---|---|---|
| | Formation of solid [B] under mechanical pulverization | | | | Modes of contacting TiCl$_4$[A] with solid [B] | Ti and Cl contents | |
| Examples No. | Mg dihalide component (g) | Free ester (b) (g) | Ti component (g) | Modes of preparation | | Ti (wt %) | Cl (wt %) |
| 17 | MgCl$_2$ . 0.12 ethyl-benzoate adduct (20) | ethyl benzoate (1.6) | — | (NO.3) Pulverization of [(a)adduct + (b)] | ** | 3.5 | 62.0 |
| 18 | MgCl$_2$ (20) | ethyl orthotoluate (8.0) | TiCl$_4$(8.0) | (NO.7) Pulverization of (Pulverization[(a)+(b)]+(c)) | ** | 3.6 | 61.0 |
| 19 | MgCl$_2$ . 0.22 ethyl-benzoate adduct (20) | ethyl p-anisate (1.6) | Phenoxy TiCl$_3$ (7.7) | (No.7) Pulverization of [(a) adduct + (b)+(c)] | *** | 3.7 | 60.8 |
| 20 | " | — | p-methylphenoxy TiCl$_3$ (4.2) | (NO.5) Pulverization of [(a)adduct +(c)] | *** | 3.5 | 61.0 |
| 21 | MgCl$_2$ . 0.12 iso-butyl benzoate adduct (20) | methyl benzoate (2.3) | TiCl$_4$ . ethyl-benzoate complex (5.8) | (NO.7) Pulverization of [Pulverization of (a)adduct+(b)+(c)complex] | *** | 3.6 | 60.7 |
| 22 | MgCl$_2$ . 0.12 n-propyl benzoate adduct (20) | — | TiCl$_4$ . ethyl benzoate complex (9.2) | (NO.5) Pulverization of [(a)adduct +(c) complex] | *** | 3.5 | 60.7 |
| 23 | MgCl$_2$ (20) | methyl benzoate (9.4) | TiCl$_4$ . methyl complex (7.1) | (NO.7) Pulverization of Pulverization of [(a)+(c)complex] +(b)] | *** | 3.2 | 61.5 |
| 24 | MgCl$_2$ (20) | — | TiCl$_4$ . n-butyl benzoate complex(12.9) | (NO.4) Pulverization of [(a)+(c)complex] | *** | 2.9 | 62.6 |
| 25 | MgCl$_2$ (20) MgCl$_2$ . 1.5 ethyl benzoate adduct (6.2) | — | — | Pulverization of [(a)+(a)adduct] | *** | 2.8 | 63.1 |
| 26 | MgBr$_2$ (18) MgCl$_2$ . 0.22 ethyl benzoate adduct(3.0) | ethyl o-toluate (4.9) | — | Pulverization of (Pulverization of [(a)adduct]+(b) +(b)) | *** | 3.1 | 61.5 |
| 27 | MgCl$_2$ (18) | ethyl o-toluate (2.4) | TiCl$_4$ (2.8) [(a)+(b)+(c) TiCl$_4$ . i-butyl benzoate complex (5.3) | Pulverization of (Pulverization of complex] | *** | 3.2 | 61.0 |
| 28 | MgCl$_2$ . 0.12 ethyl benzoate adduct(20) | — | TiCl$_4$ (2.2) TiCl$_4$ . n-butyl benzoate complex (4.3) | Pulverization of (Pulverization of [(a)adduct+(c)]+(c)complex) | *** | 2.9 | 60.6 |

Table 4-(1)-continued

| | Catalyst component supported on a carrier | | | | Modes of contacting | Ti and Cl contents | |
|---|---|---|---|---|---|---|---|
| | Formation of solid [B] under mechanical pulverization | | | | TiCl₄[A] | Ti | Cl |
| Examples No. | Mg dihalide component (g) | Free ester (b) (g) | Ti component (g) | Modes of preparation | with solid [B] | (wt %) | (wt %) |
| 29 | MgCl₂ (15) | — | TiCl₄ (1.9) | Pulverization of [(a)+(a)adduct +(c)+(c)complex] | *** | 3.1 | 62.6 |
| | MgCl₂ . 0.12 ethyl benzoate adduct (5) | | TiCl₄ benzyl benzoate complex (10.4) | | | | |
| 30 | MgCl₂ . 0.12 ethyl benzoate adduct(20) | i-amyl benzoate (1.7) | TiCl₄ (1.7) TiCl₄ . n-hexyl benzoate complex (3.5) | Pulverization of (Pulverization of {Pulverization of [(a)adduct +(c)]+ (b)}+(c)complex) | *** | 2.9 | 63.0 |
| 31 | MgCl₂ (15) | ethyl anisate (1.9) | TiCl₄ (3.8) | Pulverization of (Pulverization of [(a)+(a)adduct+ (b)+(c)]+(c) complex) | *** | 2.8 | 63.5 |
| | MgCl₂ . 0.12 ethyl benzoate adduct (5) | | TiCl₄ . methyl benzoate complex (3.2) | | | | |

Table 4-(2)

| | Results of polymerization | | | | |
|---|---|---|---|---|---|
| Examples | Amount of powdery polymer (g) | Amount of soluble polymer (g) | Extraction residue of the powdery polymer (%) | Apparent density (g/ml.) | Average specific activity |
| 17 | 293.0 | 17.5 | 92.1 | 0.29 | 345 |
| 18 | 286.9 | 18.2 | 92.3 | 0.28 | 339 |
| 19 | 254.3 | 17.5 | 93.1 | 0.31 | 302 |
| 20 | 258.3 | 18.0 | 93.4 | 0.31 | 307 |
| 21 | 258.8 | 19.3 | 93.9 | 0.29 | 309 |
| 22 | 258.3 | 18.9 | 93.7 | 0.29 | 308 |
| 23 | 264.1 | 19.4 | 93.6 | 0.28 | 315 |
| 24 | 265.3 | 19.1 | 93.6 | 0.28 | 316 |
| 25 | 257.9 | 18.4 | 93.1 | 0.28 | 307 |
| 26 | 265.0 | 18.5 | 93.3 | 0.27 | 315 |
| 27 | 265.8 | 18.6 | 93.2 | 0.28 | 316 |
| 28 | 259.3 | 18.8 | 93.1 | 0.28 | 309 |
| 29 | 263.8 | 18.8 | 93.3 | 0.27 | 314 |
| 30 | 257.6 | 20.5 | 93.6 | 0.28 | 309 |
| 31 | 251.8 | 20.0 | 93.7 | 0.28 | 302 |

[Note]
The "Mode of Preparation" of solid [B] is indicated by the specific embodiments (1) through (7) given in the specification.
*grams of polypropylene/Ti m-mol.hr.atm.
**10 g of the pulverized product was treated with 100 ml of TiCl₄ at 80° C. for 2 hours.
***10 g of the pulverized product was treated in 150 ml of kerosene dissolving 10 ml of TiCl₄ at 100° C. for 2 hours.

Comparative Example 1

Catalyst Preparation 20g of commercially available anhydrous magnesium chloride was suspended in 300 ml of hexane in an atmosphere of nitrogen. To the resulting suspension was added 5.4g of ethyl benzoate, followed by heating the mixture at 50° C. for 30 minutes with agitation. The solid part was recovered by filtration and then dried under reduced pressure. The solid was found to have a composition of

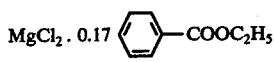

$MgCl_2 . 0.17 \langle \phantom{O} \rangle-COOC_2H_5$ by analysis.

10g of the solid so obtained was suspended in a solution of 10 ml of titanium tetrachloride in 150 ml of kerosine. The resulting suspension was stirred at 100° C. for 2 hours Then the solid component was collected by filtration, and washed with purified hexane until free TiCl₄ was no longer detected. A Ti-containing solid catalyst component was then obtained by drying the solid component. The resulting catalyst component contained 0.5 wt% of Ti and 76.3 wt% of Cl as atoms.

Polymerization

A 2-liter autoclave was charged with 750 ml of kerosene sufficiently free of oxygen and moisture, 0.05 ml (0.375 mmol) of triethylaluminum, and 0.0375 mmol (calculated as Ti atom) of the solid catalyst component. The polymerization system was heated, and when the temperature reached 60° C., propylene was introduced. Polymerization of the propylene was started at a total pressure of 8.0 kg/cm². After continuing polymerization at 60° C. for 3 hours, introduction of propylene was topped. The contents of the autoclave were cooled to room temperature, and its solid component was collected by filtration, and dried to afford 28.4g of polypropylene was a white powder. The boiling n-heptane extraction residue and the apparent density of the white polypropylene powder were 82.6% and 0.13 g/ml, respectively. On the other hand, the liquid phase was concentrated to yield 4.0g of a solvent-soluble polymer. The average specific polymerization activity per Ti atom of the catalyst used was 36 g-polypropylene/m-mol-Ti.hr.atm.

Comparative Example 2

Preparation of catalyst component

An 800-ml stainless (SUS-32) ball mill with an inside diameter of 100 mm, accomodating therein 28 kg of stainless steel (SUS-32) balls each having a diameter of 15 mm, was charged with 20g of commercially available anhydrous magnesium chloride and 5.3g of ethyl benzoate in an atmosphere of nitrogen, and they were brought into mutual contact for 24 hours at an acceleration of impact of 7G. To the resulting solid treated product was added 4.0g of titanium tetrachloride, and they were further brought into mutual contact for 10 hours under comminuting conditions.

The resulting comminuted product was washed with purified hexane until free TiCl₄ was no longer detected during washing and was dried to afford a Ti-containing solid catalyst component. The resulting catalyst component contained 3.5 wt% of Ti and 61.5 wt% of Cl.

Polymerization

A 2-liter autoclave was charged with 750 ml of kerosene sufficiently free of oxygen and moisture, 0.05 ml (0.375 mmol) of triethylaluminum, and 0.0375 mmol (calculated as Ti atom) of the solid catalyst component. The polymerization system was heated, and when the temperature reached 60° C., propylene was introduced. Polymerization of the propylene was started at a total pressure of 8.0 kg/cm². After continuing polymerization at 60° C. for 3 hours, introduction of propylene was stopped. The contents of the autoclave were cooled to room temperature, and its solid component was collected by filtration, and dried.

The results are shown in Table 5 together with the results of comparative Examples 1 and 2.

Table 5

| | Solid catalyst component Ti and Cl contents | | Result of polymerization | | | | |
|---|---|---|---|---|---|---|---|
| | | | Polymer yield | | Extraction | | |
| No. | Ti (wt %) | Cl (wt %) | Powdery polymer (g) | Soluble polymer (g) | residue of powdery polymer (%) | Apparent density (g/ml) | Average specific activity* |
| Comparative Example 1 | 0.5 | 76.3 | 28.4 | 4.0 | 82.6 | 0.13 | 36 |
| Comparative Example 2 | 3.5 | 61.5 | 46.5 | 3.9 | 89.5 | 0.19 | 56 |
| Example 32 | 3.5 | 61.0 | 293.0 | 17.5 | 92.1 | 0.29 | 345 |

*Grams of polypropylene/Ti-mmol.hr.atm sene sufficiently free of oxygen and moisture, 0.05 ml (0.375 mmol) of triethylaluminum, and 0.0375 mmol (calculated as Ti atom) of the solid catalyst component. The polymerization system was heated, and when the temperature reached 60° C., propylene was introduced. Polymerization of the propylene was started at a total pressure of 8.0 kg/cm². After continuing polymerization at 60° C. for 3 hours, introduction of propylene was stopped. The contents of the autoclave were cooled at room temperature, and its solid component was collected by filtration, and dried to afford 46.5g of polypropylene was a white powder. The boiling n-heptane extraction residue and the apparent density of the white polypropylene powder were 89.5% and 0.19 g/ml, respectively. On the other hand, the liquid phase was concentrated to yield 3.9g of a solvent-soluble polymer. The average specific polymerization activity per Ti atom of the catalyst used was 56 g-polypropylene/m-molTi.hr.atm.

EXAMPLE 32

Process for the preparation of catalyst components

The same ball mill as used in Comparative Example 2 was charged with 20g of commercially available anhydrous magnesium chloride and 5.3g of ethyl benzoate, and they were brought into mutual contact for 24 hours at an acceleration of impact of 7G.

10g of the resulting comminuted product was suspended in a solution of 10 ml of titanium tetrachloride dissolved in 150 ml of kerosine, and the suspension was stirred at 100° C. for 2 hours.

Then the solid component was collected by filtration, and washed with purified hexane until free TiCl₄ was no longer detected. A Ti-containing solid catalyst component was then obtained by drying the said solid component. The resulting catalyst component contained 3.5 wt% of Ti and 61.0 wt% of Cl as atoms.

Comparative Example 3

After purging a 2-liter autoclave with propylene 750 ml of purified kerosine sufficiently free of oxygen and moisture was introduced into the autoclave. To the autoclave were added 0.375 mmol of ethyl acetate, 0.375 mmol of n-Butyl magnesium chloride 0.375 mmol of diethylaluminum chloride and 0.0375 mmol of TiCl₄ in this order. After sealing, the contents of the autoclave were heated, and when the temperature of the polymerization system reached 120° C., propylene was introduced. Polymerization of the propylene was started at a total pressure of 8 kg/cm². After conducting the polymerization at 120° C. for 1 hour, introduction of propylene was stopped. The contents of the autoclave were cooled to room temperature. All the solvent was evaporated off only to afford 5g of a polymer.

What we claim is:

1. A process for preparing a catalyst component supported on a carrier, which comprises contacting in a treatment liquid (A) a titanium tetrahalide in the liquid or gaseous phase with (B) a solid in the absence of mechanical pulverization, at a temperature of 40° C to the boiling point of the treatment liquid, to thereby chemically bond the titanium tetrahalide (A) to the solid (B), said solid (B) being obtained by either 1. mechanically pulverizing an adduct of a magnesium dihalide with a monocyclic aromatic monocarboxylic acid ester;
   2. mechanically pulverizing a magnesium dihalide and an adduct of a magnesium dihalide with a monycyclic aromatic momocarboxylic acid ester;
   3. mechanically pulverizing a monocyclic aromatic monocarboxylic acid ester and at least one magnesium dihalide component selected from the group consisting of magnesium dihalides and adducts thereof with monocyclic aromatic monocarboxylic acid esters;

4. mechanically pulverizing a magnesium dihalide and a complex of a titanium compound of the formula $$Ti(OR)_nX_{4-n}$$

wherein R is an alkyl radical, or a phenyl radical optionally substituted by a lower alkyl group, X is a halogen atom, and $n$ is an integer of 0 to 4, with a monocyclic aromatic monocaroxylic acid ester;

5. mechanically pulverizing an adduct of a magnesium dihalide with a monocyclic aromatic monocarboxylic acid ester and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters;

6. mechanically pulverizing a magnesium dihalide, an adduct of a magnesium dihalide with a monocyclic aromatic monocarboxylic acid ester, and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters; or 7. mechanically pulverizing a monocyclic aromatic monocarboxylic acid ester, at least one magnesium dihalide component selected from the group consisting of magnesium dihalides and adducts thereof with monocyclic aromatic monocarboxylic acid esters, and at least one titanium component selected from the group consisting of titanium compounds of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters, wherein the amounts of the magnesium dihalide (a), the monocyclic aromatic monocarboxylic acid ester (b) and the titanium compound (c) of the above formula are selected such that the molar ratio of (a):(b) in (1), (2) and (3) above is 1:10 to 0.005 and the molar ratio of (a):(b):(c) in the case of (4), (5), (6) and (7) above is 1: (10 to 0.005):(100 to 0.001), and wherein when the adduct of magnesium dihalide or the complex of titanium compound is used, the amount of the monocyclic aromatic monocarboxylic acid ester therein is considered as the amount of (b) and wherein said monocyclic aromatic monocarboxylic acid ester (b) is an ester of benzoic acid, hydroxybenzoic acid, alkoxy benzoic acid or alkyl benzoic acid.

2. The process of claim 1 wherein said monocyclic aromatic monocarboxylic acid ester is selected from the group consisting of $C_1$-$C_8$ saturated or unsaturated alkyl esters of benzoic acid; $C_3$-$C_8$ cycloalkyl esters of benzoic acid; aryl esters of benzoic acid with the aryl group optionally containing a substituent selected from the group consisting of halogen atoms and alkyl groups containing 1 to 4 carbon atoms; $C_1$-$C_8$ saturated or unsaturated alkyl esters of hydroxybenzoic acid; $C_3$-$C_8$ cycloalkyl esters of hydroxybenzoic acid; aryl esters of hydroxybenzoic acid with aryl group optionally containing a substituent selected from the group consisting of halogen atoms and alkyl groups containing 1 to 4 carbon atoms; $C_1$-$C_8$ saturated or unsaturated alkyl esters of alkoxybenzoic acids with the alkoxy group containing 1 to 4 carbon atoms; aryl esters of alkoxybenzoic acids with the alkoxy group containing 1 to 4 carbon atoms in which the aryl group optionally contains a substituent selected from the group consisting of halogen atoms and alkyl groups containing 1 to 4 carbon atoms; $C_1$-$C_8$ saturated or unsaturated alkyl esters of alkylbenzoic acids in which the saturated or unsaturated alkyl group contains 1 to 4 carbon atoms; and aryl esters of alkylbenzoic acids in which the saturated or unsaturated alkyl group contains 1 to 4 carbon atoms and the aryl group optionally contains a substituent selected from the group consisting of halogen atoms and alkyl groups containing 1 to 4 carbon atoms.

3. The process of claim 1 wherein said solid (B) is obtained by (1) mechanically pulverizing an adduct of a magnesium dihalide with a monocyclic aromatic monocarboxylic acid ester.

4. The process of claim 1 wherein said solid (B) is obtained by (2) mechanically pulverizing a magnesium dihalide and an adduct of a magnesium dihalide with a monocyclic aromatic monocarboxylic acid ester.

5. The process of claim 1 wherein said solid (B) is obtained by (3) mechanically pulverizing a monocyclic aromatic monocarboxylic acid ester and at least one magnesium dihalide component selected from the group consisting of magnesium dihalides and adducts thereof with monocyclic aromatic monocarboxylic acid esters.

6. The process of claim 1 wherein said solid (B) is obtained by (4) mechanically pulverizing a magnesium dihalide and a complex of a titanium compound of the formula $$Ti(OR)_nX_{4-n}$$

wherein R is an alkyl radical, or a phenyl radical optionally substituted by a lower alkyl group, X is a halogen atom, and $n$ is an integer of 0 to 4, with a monocyclic aromatic monocarboxylic acid ester.

7. The process of claim 1 wherein said solid (B) is obtained by (5) mechanically pulverizing an adduct of a magnesium dihalide with a monocyclic aromatic monocarboxylic acid ester and at least one titanium component selected from the group consisting of the formula $$Ti(OR)_nX_{4-n}$$

wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters.

8. The process of claim 1 wherein said solid (B) is obtained by (6) mechanically pulverizing a magnesium dihalide, an adduct of a magnesium dihalide with a monocyclic aromatic monocarboxylic acid ester, and at least one titanium component selected from the group consisting of titanium compounds of the formula Ti(OR)$_n$X$_{4-n}$ wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters.

9. The process of claim 1 wherein said solid (B) is obtained by (7) mechanically pulverizing a monocyclic aromatic monocarboxylic acid ester, at least one magnesium dihalide component selected from the group consisting of magnesium dihalides and adducts thereof with monocyclic aromatic monocarboxylic acid esters, and at least one titanium component selected from the group consisting of the formula Ti(OR)$_n$X$_{4-n}$ wherein R is an alkyl radical, or a phenyl radical optionally substituted by a lower alkyl group, X is a halogen atom, and $n$ is an integer of 0 to 4, and complexes thereof with monocyclic aromatic monocarboxylic acid esters.

* * * * *

UNITED STATES PATENT OFFICE
CERTIFICATE OF CORRECTION

Patent No. 4,069,169            Dated January 17, 1978

Inventor(s) Akinori Toyota, et al

It is certified that error appears in the above-identified patent and that said Letters Patent are hereby corrected as shown below:

Claim 1, line 14, "momocarboxylic" should read -- monocarboxylic --.

Claim 2, line 9, after "with", insert -- the --.

Item /19/, line 2, delete "Toyoda", insert --Toyota--.

Item /75/, line 1, delete "Toyoda", insert --Toyota--.

Signed and Sealed this

First Day of August 1978

[SEAL]

Attest:

RUTH C. MASON
*Attesting Officer*

DONALD W. BANNER
*Commissioner of Patents and Trademarks*